United States Patent
Na et al.

(10) Patent No.: US 12,222,937 B2
(45) Date of Patent: Feb. 11, 2025

(54) TRAINING A MACHINE LEARNED MODEL TO DETERMINE RELEVANCE OF ITEMS TO A QUERY USING DIFFERENT SETS OF TRAINING DATA FROM A COMMON DOMAIN

(71) Applicant: Maplebear Inc., San Francisco, CA (US)

(72) Inventors: Taesik Na, Issaquah, WA (US); Yuqing Xie, Toronto (CA); Tejaswi Tenneti, Fremont, CA (US); Haixun Wang, Palo Alto, CA (US)

(73) Assignee: Maplebear Inc., San Francisco, CA (US)

( * ) Notice: Subject to any disclaimer, the term of this patent is extended or adjusted under 35 U.S.C. 154(b) by 127 days.

(21) Appl. No.: 17/668,358

(22) Filed: Feb. 9, 2022

(65) Prior Publication Data

US 2023/0306023 A1 Sep. 28, 2023

(51) Int. Cl.
| | |
|---|---|
| *G06F 16/2453* | (2019.01) |
| *G06F 16/242* | (2019.01) |
| *G06F 16/2457* | (2019.01) |
| *G06F 16/28* | (2019.01) |
| *G06F 18/214* | (2023.01) |
| *G06N 20/00* | (2019.01) |

(52) U.S. Cl.
CPC .... *G06F 16/24534* (2019.01); *G06F 16/2448* (2019.01); *G06F 16/24578* (2019.01); *G06F 16/283* (2019.01); *G06F 18/2148* (2023.01); *G06N 20/00* (2019.01)

(58) Field of Classification Search
CPC .......... G06F 16/24534; G06F 16/2448; G06F 16/24578; G06F 16/283; G06F 18/2148; G06N 20/00
USPC ........................................ 707/713
See application file for complete search history.

(56) References Cited

U.S. PATENT DOCUMENTS

| | | | |
|---|---|---|---|
| 2007/0032247 A1* | 2/2007 | Shaffer | H04L 67/52 455/456.1 |
| 2012/0311584 A1 | 12/2012 | Gruber et al. | |

(Continued)

OTHER PUBLICATIONS

PCT International Search Report and Written Opinion, PCT Application No. PCT/US2022/051304, Feb. 28, 2023, 12 pages.

(Continued)

*Primary Examiner* — Hosain T Alam
*Assistant Examiner* — Saba Ahmed
(74) *Attorney, Agent, or Firm* — Fenwick & West LLP

(57) ABSTRACT

An online concierge system maintains various items and an item embedding for each item. When the online concierge system receives a query for retrieving one or more items, the online concierge system generates an embedding for the query. The online concierge system trains a machine-learned model to determine a measure of relevance of an embedding for a query to item embeddings by generating training data of examples including queries and items with which users performed a specific interaction. The online concierge system generates a subset of the training data including examples satisfying one or more criteria and further trains the machine-learned model by application to the examples of the subset of the training data and stores parameters resulting from the further training as parameters of the machine-learned model.

20 Claims, 6 Drawing Sheets

(56) References Cited

U.S. PATENT DOCUMENTS

| | | |
|---|---|---|
| 2018/0075338 A1 | 3/2018 | Gokmen |
| 2018/0196800 A1* | 7/2018 | Volkovs .................. G06F 40/30 |
| 2019/0114583 A1 | 4/2019 | Ripert et al. |
| 2020/0151692 A1* | 5/2020 | Gao ..................... G06Q 20/201 |
| 2021/0158168 A1* | 5/2021 | Ahmad .................... G06N 3/04 |
| 2021/0256420 A1* | 8/2021 | Elisha ...................... G06N 5/04 |
| 2022/0237465 A1* | 7/2022 | Lewis .................... G06N 3/082 |
| 2022/0245322 A1* | 8/2022 | Lundin .................. G06T 11/60 |

OTHER PUBLICATIONS

Van De Schoot, R. et al. "An Open-Source Machine Learning Framework for Efficient and Transparent Systematic Reviews," Nature Machine Intelligence, vol. 3, No. 2, Feb. 3, 2021, pp. 125-133.

\* cited by examiner

TRAINING A MACHINE LEARNED MODEL TO DETERMINE RELEVANCE OF ITEMS TO A QUERY USING DIFFERENT SETS OF TRAINING DATA FROM A COMMON DOMAIN

BACKGROUND

This disclosure relates generally to training a machine-learned model to determine measures of relevance of item embeddings to an embedding for a query, and more specifically to using different sets of training data from a common domain to train the machine-learned model.

Many online systems, such as online concierge systems, receive queries from users and retrieve items matching or otherwise relevant to the query. For example, an online concierge system receives a query from a user and retrieves items offered by one or more warehouses that satisfy the query. Commonly, online systems compare text information describing items to a received query and retrieve items with text description matching at least a part of the query.

An online system may train a machine-learned model to determine a probability of the user performing an interaction with an item after providing a query to the online system. Many online systems use data describing interactions with items by users through the online system to generate training data for training the machine-learned model. For example, an online system identifies previously received queries and items selected by users (e.g., included in orders by users, saved by users, accessed by users) after the queries were received. However, the user interactions may include items that were selected by users despite being irrelevant to a query received from the user. These items that are unrelated to received queries introduces noise into the data for training the machine-learned model, decreasing accuracy of the machine-learned model in determining a probability of the user performing an interaction with an item displayed in response to the query.

SUMMARY

In one or more embodiments, an online concierge system generates item embeddings for items offered by one or more warehouses. An "embedding" refers to descriptive data associated with an item or a user that indicates attributes or characteristics of the item or the user. Example attributes of an item from which an item embedding is generated include words or phrases provided by users to identify the item, one or more categories associated with the item, popularity of the item at a warehouse, or any other suitable attributes. The online concierge system may generate the item embeddings from an item model, which comprises one or more machine learning models in various embodiments, or may generate the item embeddings from one or more layers of a machine-learned model. In other embodiments, the online concierge system has stored item embeddings or obtains item embeddings from a source and retrieves the item embeddings. The online concierge system may maintain or obtain other information describing items offered by one or more warehouses in other embodiments.

Additionally, the online concierge system trains and maintains a machine-learned model that generates a probability of a user performing a specific interaction with an item, such as purchasing the item, after the online concierge system receives a query from a user. The machine-learned model receives as input an item embedding for an item and an embedding for the query generated by the online concierge system and outputs a probability of the user performing the specific interaction with the item after the online concierge system received the query. To train the machine-learned model, the online concierge system generates training data from queries previously received from users and items with which the users performed a specific interaction after providing a query to the online concierge system. For example, the online concierge system identifies a query received from a user and an item the user included in an order within a threshold amount of time after the query was received.

The training data comprises a plurality of examples, with each example including a combination of a query received from a user and an item with which the user performed the specific interaction after the online concierge system received the query. In various embodiments, the online concierge system removes duplicate combinations of a query and item with which the specific interaction was performed after the query was received, so the training data includes a single example for each combination of query and item with which the specific interaction was performed after the query was received identified from stored prior interactions. A label is applied to each example of the training data that indicates a user performed the specific interaction with the item of the example after the user provided the query identified in the example to the online concierge system.

The online concierge system initializes a network of a plurality of layers that comprises the machine-learned model and applies the machine-learned model to the labeled examples of the training data. For an example of the training data, the online concierge system obtains an embedding for a query of the example and an item embedding for an item of the example and applies the machine-learned model to the embedding for the query of the example and the item embedding of the item of the example to output a predicted measure of relevance of the item of the example to the query of the example. The online concierge system compares the predicted measure of relevance of the item of the example to the query of the example to the label applied to the example. If the comparison indicates the predicted measure of relevance differs from the label applied to the example (e.g., the predicted measure of relevance is less than a threshold for performing the specific interaction with the item when the label indicates the specific interaction with the item was performed or the predicted measure of relevance is above a threshold for performing the specific interaction with the item when the label indicates the specific interaction was not performed), the online concierge system updates one or more parameters of the machine-learned model using any suitable supervised learning method. For example, the online concierge system backpropagates the one or more error terms from the label applied to an example of the training data and the output of the machine-learned model. One or more parameters of the machine-learned model are modified through any suitable technique from the backpropagation of the one or more error terms through the layers of the network comprising the machine-learned model. The error term may be generated through any suitable loss function, or combination of loss functions, in various embodiments. The online concierge system may iteratively update the machine-learned model a specified number of times or until one or more criteria are satisfied using any suitable supervised learning method. When the one or more loss functions satisfy the one or more conditions, the modeling engine stops modification of the one or more parameters of the machine-learned model and stores the parameters of the machine-learned model.

Because the machine-learned model is trained from occurrences of the specific interaction by users after the users provided queries to the online concierge system, the training data may be affected by users who performed the specific interaction with one or more items that are unrelated to a query from the user. For example, a user including an item that is unrelated to a query provided to the online concierge system from the user is included in the training data. In an example, a user provides a query of "milk," and subsequently includes salsa in an order. As these combinations of queries with subsequent inclusion of a disparate item in an order are included in the training data, these combinations can decrease accuracy of the machine-learned model after training.

To compensate for inclusion of combinations of queries and performance of the specific interaction with items less relevant to the queries, the online concierge system generates a subset of the training data by applying one or more filters to the training data. Application of the one or more filters causes the subset of the training data to include more specific data than the training data. In some embodiments, the online concierge system generates the subset of the training data based on frequencies with which users performed the specific interaction with different items. For example, the online concierge system identifies items for which the specific interaction was performed with at least an additional threshold frequency after a query was received from the training data and generates the subset of training data including pairs of a query and an identified item. As another example, the online concierge system ranks combinations of queries and items based on frequencies with which users performed the specific interaction with an item after the online concierge system received a query and generates the subset of the training data including pairs of a query and an item having at least a threshold position in the ranking. Hence, the subset of training data includes examples comprising combinations of a query and an item that were selected from the training data based on a frequency with which the specific interaction was performed by users for different items. This allows the subset of the training data to include examples relating to items with which the specific interaction was performed, increasing the likelihood of the examples of the subset of the training data including items relevant to a query. Each example of the subset of the training data includes a query and an item with which the specific interaction was performed after the query was received, with a label applied to the example of the subset of the training data indicating that the specific interaction was performed with the item included in the example after the query included in the example was received by the online concierge system.

In some embodiments, when generating the subset of the training data, the online concierge system replicates certain examples from the training data in the subset. For example, the online concierge system includes a specific number of replicas of an example from the training data in the subset in response to the example including to an item with which the specific interaction was performed with at least a specific threshold frequency. Hence, the subset includes multiple instances of examples from the training data that satisfy one or more criteria. In some embodiments, the online concierge system includes different specific frequencies corresponding to different numbers of replicas, so the subset includes a number of replicas of the example that is determined based on a frequency with which the specific interaction was performed with an item included in the example. In other embodiments, the online concierge system includes any suitable criteria that, when satisfied by an example selected from the training data, cause the online concierge system to replicate the example a specified number of times in the subset.

The online concierge system initializes parameters of the machine-learned model to the parameters stored after application of the machine-learned model to the training data. This leverages training of the machine-learned model from the training data. The online concierge system uses the subset of the training data to further modify parameters of the machine-learned model by applying the machine-learned model to the labeled examples of the training data. For an example of the subset of the training data, the online concierge system obtains an embedding for a query of the example of the subset of the training data and an item embedding for an item of the example of the subset of the training data and applies the machine-learned model to the embedding for the query of the example of the subset of the training data and the item embedding of the item of the example of the subset of the training data to output a predicted measure of relevance of the item of the example of the subset of the training data to the query of the example of the subset of the training data. The online concierge system compares the predicted measure of relevance of the item of the example of the subset of the training data to the query of the example of the subset of the training data to the label applied to the example of the subset of the training data. If the comparison indicates the predicted measure of relevance differs from the label applied to the example of the subset of the training data (e.g., the predicted measure of relevance is less than a threshold for performing the specific interaction with the item when the label indicates the specific interaction with the item was performed or the predicted measure of relevance is above a threshold for performing the specific interaction with the item when the label indicates the specific interaction was not performed), the modeling engine modifies one or more parameters of the machine-learned model using any suitable supervised learning method. For example, the online concierge system backpropagates the one or more error terms from the label applied to an example of the subset of the training data and the output of the machine-learned model. One or more parameters of the machine-learned model are modified through any suitable technique from the backpropagation of the one or more error terms through the layers of the network comprising the machine-learned model. The error term may be generated through any suitable loss function, or combination of loss functions, in various embodiments. The online concierge system may iteratively modify the machine-learned model a specified number of times or until one or more criteria are satisfied using any suitable supervised learning method. For example, the online concierge system iteratively modifies the machine-learned model until a loss function based on a difference between a label applied to an example of the subset of the training data and a probability generated by the machine-learned model satisfies one or more conditions. When the one or more loss functions satisfy the one or more conditions, the online concierge system stops modification of the one or more parameters of the machine-learned model and stores the modified parameters of the machine-learned model.

When modifying the one or more parameters of the machine-learned model, the online concierge system may use one or more alternative suitable loss functions, or combination of loss functions, than the loss function, or loss functions, used when the machine-learned model was applied to the examples of the training data. In some embodiments, rather than include replicas of certain examples from the training data in the subset of the training data, as further described above, the online concierge system uses the alternative loss functions when backpropagating error terms from application of the machine-learned model to examples of the subset of the training data through the machine-learned model. For example, an alternative loss function applies a higher weight to an error term when backpropagating the error term from application of the machine-learned model to one or more examples of the subset of the training data through layers of the machine-learned model.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
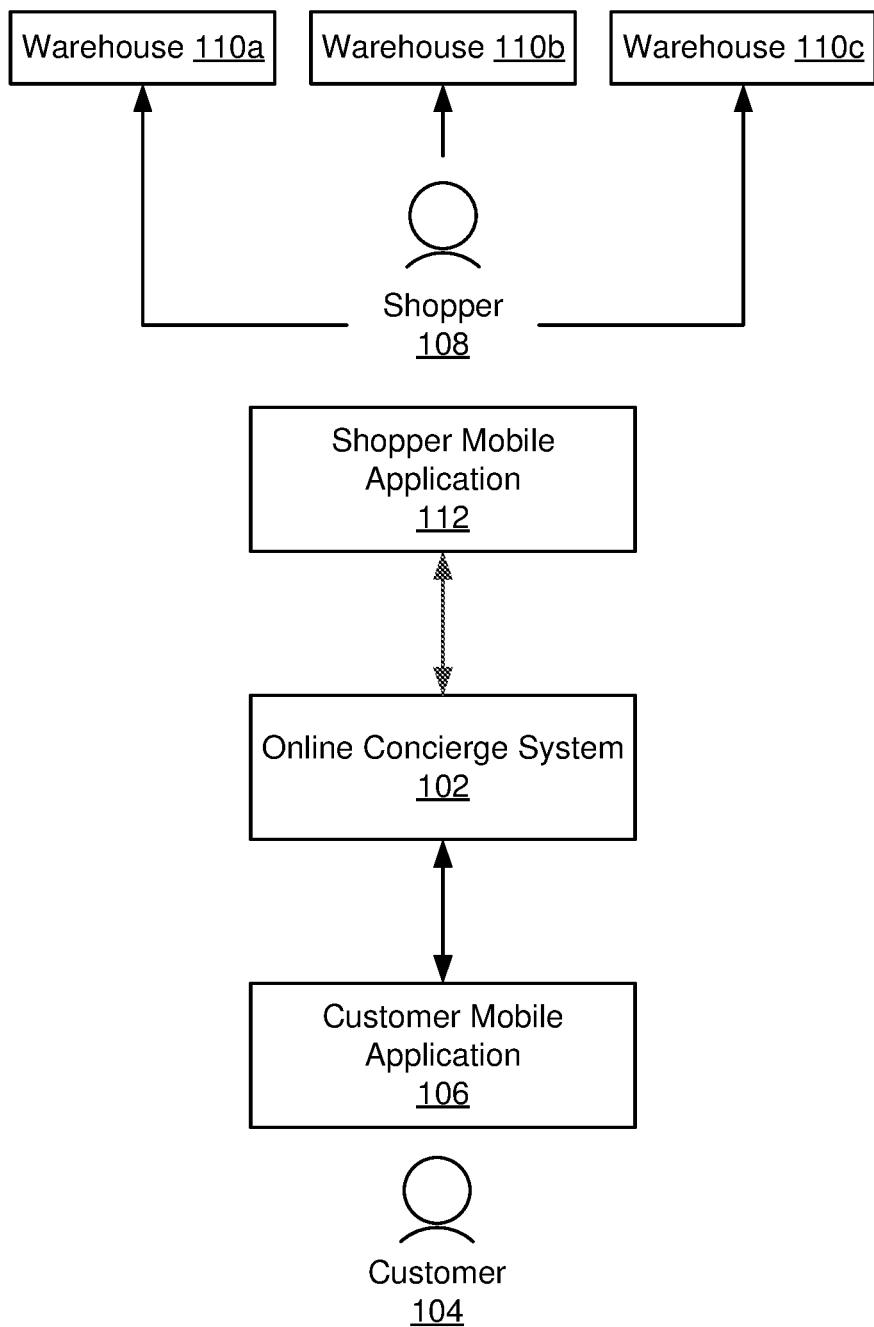
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
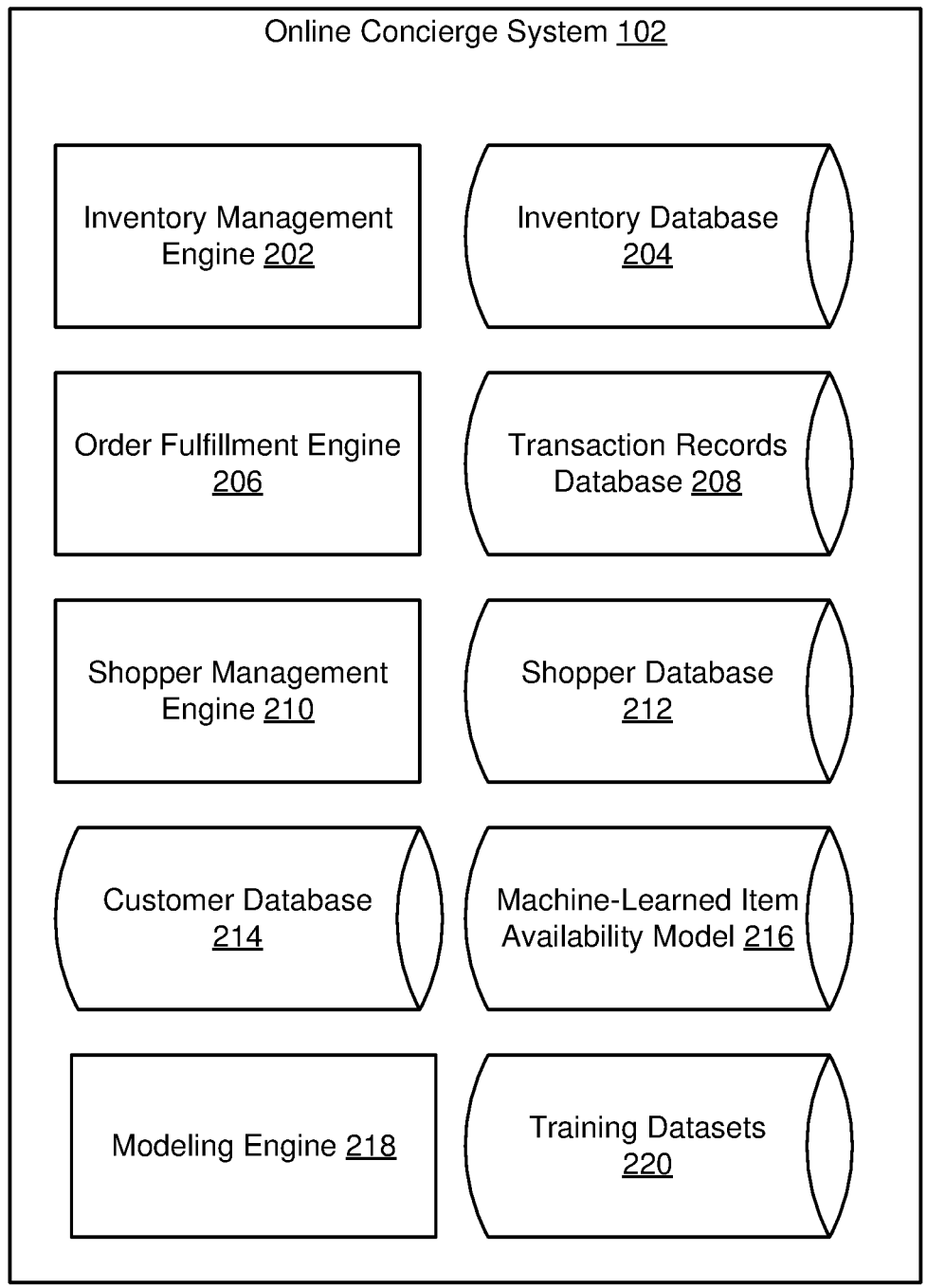
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records-one for each participating warehouse 110—or may consolidate or combine inventory information into a unified record. Inventory information includes attributes of items that include both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

For each item, the inventory database 204 identifies one or more attributes of the item and corresponding values for each attribute of an item. For example, the inventory database 204 includes an entry for each item offered by a warehouse 110, with an entry for an item including an item identifier that uniquely identifies the item. The entry includes different fields, with each field corresponding to an attribute of the item. A field of an entry includes a value for the attribute corresponding to the attribute for the field, allowing the inventory database 204 to maintain values of different categories for various items. Additionally, an entry for an item includes an item embedding generated for the item, as further described below in conjunction with FIG. 5.

In various embodiments, the inventory management engine 202 maintains a taxonomy of items offered for purchase by one or more warehouses 110. For example, the inventory management engine 202 receives an item catalog from a warehouse 110 identifying items offered for purchase by the warehouse 110. From the item catalog, the inventory management engine 202 determines a taxonomy of items offered by the warehouse 110. different levels in the taxonomy providing different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.), with the category. Thus, the taxonomy maintains associations between a category and specific items offered by the warehouse 110 matching the category. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels in the taxonomy include less detail about items, so greater numbers of items are included in higher levels (e.g., higher levels include a greater number of items satisfying a broader category). Similarly, lower levels in the taxonomy include greater detail about items, so fewer numbers of items are included in the lower levels (e.g., higher levels include a fewer number of items satisfying a more specific category). The taxonomy may be received from a warehouse 110 in various embodiments. In other embodiments, the inventory management engine 202 applies a trained classification module to an item catalog received from a warehouse 110 to include different items in levels of the taxonomy, so application of the trained classification model associates specific items with categories corresponding to levels within the taxonomy.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In various embodiments, the order fulfillment engine 206 generates and transmits a search interface to a client device of a user for display via the customer mobile application 106. The order fulfillment engine 206 receives a query comprising one or more terms from a user and retrieves items satisfying the query, such as items having descriptive information matching at least a portion of the query. In various embodiments, the order fulfillment engine 206 leverages item embeddings for items to retrieve items based on a received query. For example, the order fulfillment engine 206 generates an embedding for a query and determines measures of similarity between the embedding for the query and item embeddings for various items included in the inventory database 204. In various embodiments, the order fulfillment engine 206 retrieves a machine-learned model from the modeling engine 218 that generates a measure of relevance of items to a received query based on item embeddings for the items and an embedding for the received query. The machine-learned model is trained as further described below in conjunction with FIG. 4.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse 110 to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

In various embodiments, the order fulfillment engine 206 determines whether to delay display of a received order to shoppers for fulfillment by a time interval. In response to determining to delay the received order by a time interval, the order fulfilment engine 206 evaluates orders received after the received order and during the time interval for inclusion in one or more batches that also include the received order. After the time interval, the order fulfillment engine 206 displays the order to one or more shoppers via the shopper mobile application 112; if the order fulfillment engine 206 generated one or more batches including the received order and one or more orders received after the received order and during the time interval, the one or more batches are also displayed to one or more shoppers via the shopper mobile application 112.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g., if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times, and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood, and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

In various embodiments, the training datasets 220 include training data generated from prior interactions by users with items and queries the online concierge system 102 previously received from users. As further described below in conjunction with FIGS. 4 and 5, the training data includes examples comprising combinations of a query received by the online concierge system 102 and an item with which a user performed a specific interaction after the online concierge system 102 received the query. For example, the training data includes an item identifier of an item with which a user performed the specific interaction and one or more terms included in a query the online concierge system 102 received before the user performed the specific interaction. As further described below in conjunction with FIGS. 4 and 5, the modeling engine 218 generates a subset of the training data by selecting examples of the training data satisfying one or more criteria. For example, the subset of the training data includes examples of the training data that include items with which the specific interaction was performed with a specific frequency or with which the specific interaction was performed a threshold number of times.

Customer Mobile Application

Figure 3A:
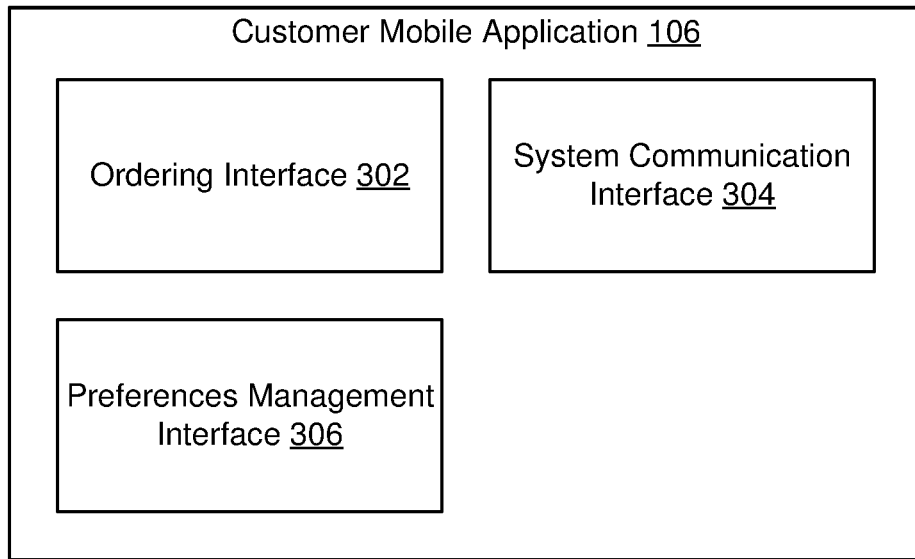
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
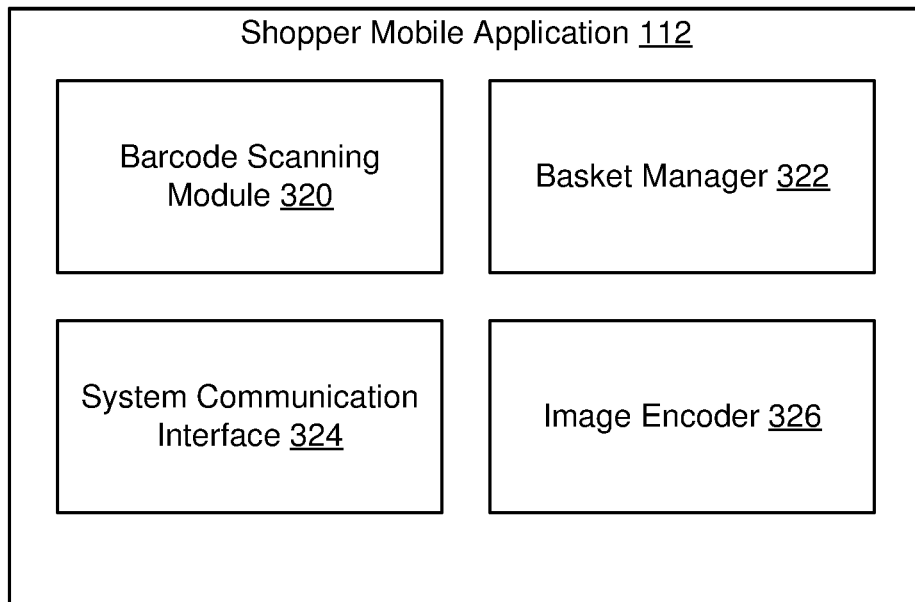
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Training a Model to Determine a Measure of Relevance of an Item to a Query

Figure 4:
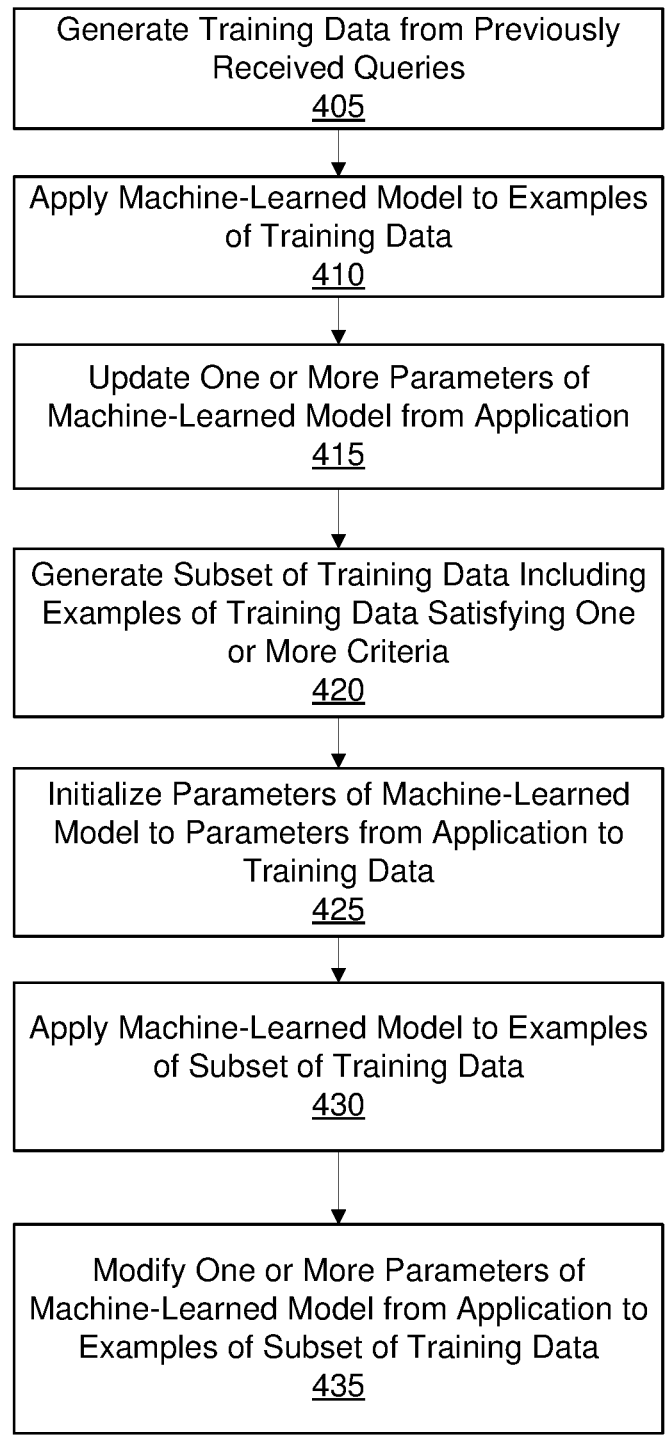
FIG. 4 is a flowchart of a method for training a machine-learned model to determine a probability of a user performing an interaction with an item, according to one embodiment.

FIG. 4 is a flowchart of a method for an online concierge system 102 training a model to determine a measure of relevance of items to a query. In various embodiments, the method includes different or additional steps than those described in conjunction with FIG. 4. Further, in some embodiments, the steps of the method may be performed in different orders than the order described in conjunction with FIG. 4. For purposes of illustration, FIG. 4 describes the online concierge system 102 performing the method, in other embodiments, other online systems providing content items for display to users may perform the steps of the method.

An online concierge system 102 generates item embeddings for items offered by one or more warehouses 110. An "embedding" refers to descriptive data associated with an item or a user that indicates attributes or characteristics of the item or the user. Example attributes of an item from which an item embedding is generated include words or phrases provided by users to identify the item, one or more categories associated with the item, popularity of the item at a warehouse 110, or any other suitable attributes. The online concierge system 102 may generate the item embeddings from an item model, which comprises one or more machine learning models in various embodiments. In other embodiments, the online concierge system 102 has stored item embeddings or obtains item embeddings from a source and retrieves the item embeddings. The online concierge system 102 may maintain or obtain other information describing items offered by warehouses 110 in some embodiments.

Additionally, the online concierge system 102 trains and maintains a machine-learned model that generates a probability of a user performing a specific interaction with an item, such as purchasing the item, after the online concierge system 102 receives a query from a user. The machine-learned model receives as input an item embedding for an item and an embedding for the query generated by the online concierge system 102 and outputs a probability of the user performing the specific interaction with the item after the online concierge system 102 received the query. In various embodiments, the probability corresponds to a measure of similarity between the user and the item that is output by the machine-learned model. To train the machine-learned model, the modeling engine 218 of the online concierge system 102 generates 405 training data from queries previously received from users and items with which the users performed a specific interaction after providing a query to the online concierge system 102. For example, the online concierge system 102 retrieves data from the transaction records database 208 identifying a query from a user and an item with which a user performed the specific interaction after the query was received. For example, the modeling engine 218 identifies a query received from a user and an item the user included in an order within a threshold amount of time after the query was received. The modeling engine 218 may retrieve data from the transaction records database 208 within specific time interval in some embodiments. For example, the modeling engine 218 retrieves data from the transaction records database describing queries received from global users of the online concierge system 102 and interactions performed by the global users of the online concierge system 102 during a specific time interval. In other examples, the modeling engine 218 identifies queries received and one or more specific interactions (e.g., inclusion of an item in an order) within a specific time interval and made by users from whom at least a threshold number of orders were created via the online concierge system 102.

The training data generated 405 from the transaction records database 208 comprises a plurality of examples, with each example including a combination of a query received from a user and an item with which the user performed the specific interaction after the online concierge system 102 received the query. In various embodiments, the online concierge system 102 removes duplicate combinations of a query and item with which the specific interaction was performed after the query was received, so the training data includes a single example for each combination of query and item with which the specific interaction was performed after the query was received identified from the prior interactions stored in the transaction records database 208. A label is applied to each example of the training data that indicates a user performed the specific interaction with the item of the example after the user provided the query identified in the example to the online concierge system 102.

The modeling engine 218 of the online concierge system 102 initializes a network of a plurality of layers that comprises the machine-learned model and applies 410 the machine-learned model to the labeled examples of the training data. For an example of the training data, the modeling engine 218 obtains an embedding for a query of the example and an item embedding for an item of the example and applies 410 the machine-learned model to the embedding for the query of the example and the item embedding of the item of the example to output a predicted measure of relevance of the item of the example to the query of the example. The modeling engine 218 compares the predicted measure of relevance of the item of the example to the query of tie example to the label applied to the example. If the comparison indicates the predicted measure of relevance differs from the label applied to the example (e.g., the predicted measure of relevance is less than a threshold for performing the specific interaction with the item when the label indicates the specific interaction with the item was performed or the predicted measure of relevance is above a threshold for performing the specific interaction with the item when the label indicates the specific interaction was not performed), the modeling engine 218 updates 415 one or more parameters of the machine-learned model using any suitable supervised learning method. For example, the modeling engine 218 backpropagates the one or more error terms from the label applied to an example of the training data and the output of the machine-learned model. One or more parameters of the machine-learned model are modified through any suitable technique from the backpropagation of the one or more error terms through the layers of the network comprising the machine-learned model. The error term may be generated through any suitable loss function, or combination of loss functions, in various embodiments. The modeling engine 218 may iteratively update the machine-learned model a specified number of times or until one or more criteria are satisfied using any suitable supervised learning method. For example, the modeling engine 218 iteratively updates the machine-learned model until a loss function based on a difference between a label applied to an example of the training data and a probability generated by the machine-learned model satisfies one or more conditions. When the one or more loss functions satisfy the one or more conditions, the modeling engine 218 stops modification of the one or more parameters of the machine-learned model and stores the parameters of the machine-learned model.

Because the machine-learned model is trained from occurrences of the specific interaction by users after the users provided queries to the online concierge system 102, the training data may be affected by users who performed the specific interaction with one or more items that are unrelated to a query from the user. For example, a user including an item that is unrelated to a query provided to the online concierge system 102 from the user is included in the training data. In an example, a user provides a query of "milk," and subsequently includes salsa in an order. As these combinations of queries with subsequent inclusion of a disparate item in an order are included in the training data, these combinations can decrease accuracy of the machine-learned model after training.

To compensate for inclusion of combinations of queries and performance of the specific interaction with items less relevant to the queries, the modeling engine 218 generates 420 a subset of training data by applying one or more filters to the training data. Application of the one or more filters causes the subset of the training data to include more specific data than the training data. In some embodiments, the modeling engine 218 generates 420 the subset of the training data based on frequencies with which users performed the specific interaction with different items. For example, the modeling engine 218 identifies items for which the specific interaction was performed with at least an additional threshold frequency after a query was received from the training data and generates 420 the subset of training data including pairs of a query and an identified item. As another example, the modeling engine 218 ranks combinations of queries and items based on frequencies with which users performed the specific interaction with an item after the online concierge system 102 received a query and generates 420 the subset of training data including pairs of a query and an item having at least a threshold position in the ranking. Hence, the subset of training data includes examples comprising combinations of a query and an item that were selected from the training data based on a frequency with which the specific interaction was performed by users for different items. Each example of the subset of the training data includes a query and an item with which the specific interaction was performed after the query was received, with a label applied to the example of the subset of the training data indicating that the specific interaction was performed with the item included in the example after the query included in the example was received by the online concierge system 102.

In some embodiments, when generating 420 the subset of the training data, the modeling engine 218 replicates certain examples from the training data in the subset. For example, the modeling engine 218 includes a specific number of replicas of an example from the training data in the subset in response to the example including to an item with which the specific interaction was performed with at least a specific threshold frequency. Hence, the subset includes multiple instances of examples from the training data that satisfy one or more criteria. In some embodiments, the modeling engine 218 includes different specific frequencies corresponding to different numbers of replicas, so the subset includes a number of replicas of the example that is determined based on a frequency with which the specific interaction was performed with an item included in the example. In other embodiments, the modeling engine 218 includes any suitable criteria that, when satisfied by an example selected from the training data, cause the modeling engine 218 to replicate the example a specified number of times in the subset.

The modeling engine 218 initializes 425 parameters of the machine-learned model to the parameters stored after application of the machine-learned model to the training data. This leverages training of the machine-learned model from the training data. The modeling engine 218 uses the subset of the training data to further modify parameters of the machine-learned model by applying 430 the machine-learned model to the labeled examples of the training data. For an example of the subset of the training data, the modeling engine 218 obtains an embedding for a query of the example of the subset of the training data and an item embedding for an item of the example of the subset of the training data and applies 430 the machine-learned model to the embedding for the query of the example of the subset of the training data and the item embedding of the item of the example of the subset of the training data to output a predicted measure of relevance of the item of the example of the subset of the training data to the query of the example of the subset of the training data. The modeling engine 218 compares the predicted measure of relevance of the item of the example of the subset of the training data to the query of the example of the subset of the training data to the label applied to the example of the subset of the training data. If the comparison indicates the predicted measure of relevance differs from the label applied to the example of the subset of the training data (e.g., the predicted measure of relevance is less than a threshold for performing the specific interaction with the item when the label indicates the specific interaction with the item was performed or the predicted measure of relevance is above a threshold for performing the specific interaction with the item when the label indicates the specific interaction was not performed), the modeling engine 218 modifies 435 one or more parameters of the machine-learned model using any suitable supervised learning method. For example, the modeling engine 218 backpropagates the one or more error terms from the label applied to an example of the subset of the training data and the output of the machine-learned model. One or more parameters of the machine-learned model are modified 435 through any suitable technique from the backpropagation of the one or more error terms through the layers of the network comprising the machine-learned model. The error term may be generated through any suitable loss function, or combination of loss functions, in various embodiments. The modeling engine 218 may iteratively modify 435 the machine-learned model a specified number of times or until one or more criteria are satisfied using any suitable supervised learning method. For example, the modeling engine 218 iteratively modifies 435 the machine-learned model until a loss function based on a difference between a label applied to an example of the subset of the training data and a probability generated by the machine-learned model satisfies one or more conditions. When the one or more loss functions satisfy the one or more conditions, the modeling engine 218 stops modification of the one or more parameters of the machine-learned model and stores the modified parameters of the machine-learned model.

When modifying 435 the one or more parameters of the machine-learned model, the modeling engine 218 may use one or more alternative suitable loss functions, or combination of loss functions, than the loss function, or loss functions, used when the machine-learned model was applied 410 to the examples of the training data. In some embodiments, rather than include replicas of certain examples from the training data in the subset of the training data, as further described above, the modeling engine 218 uses the alternative loss functions when backpropagating error terms from application of the machine-learned model to examples of the subset of the training data through the machine-learned model. For example, an alternative loss function applies a higher weight to an error term when backpropagating the error term from application 430 of the machine-learned model to one or more examples of the subset of the training data through layers of the machine-learned model.

In some embodiments, the modeling engine 218 uses different architectures for the machine-learned model when applying 410 the machine-learned model to examples from the training data and when applying 430 the machine-learned model to examples from the subset of the training data. For example, the modeling engine 218 configures the machine-learned model as a two-tower architecture including a portion configured to receive a query from an example of the training data and to generate the embedding for the query and a separate portion configured to receive an item from an example of the training data and to generate the item embedding for the item, with the machine-learned model maintaining separate parameters for the portion generating the embedding for the query and for the portion generating the item embedding. In the preceding example architecture, the machine-learned model subsequently determines a measure of relevance between the generated item embedding and the generated embedding for the query. Following the preceding example, the modeling engine 218 configures the machine-learned model as a Siamese architecture for application to examples of the subset of the training data, where parameters are shared between a portion configured to generate an item embedding for an item of an example of the subset of the training data and a portion configured to generate the embedding for the query and subsequently compare the generated embedding for the query and the item embedding. In other embodiments, the modeling engine 218 uses the Siamese architecture when applying 410 the machine-learning model to examples of the training data and the two-tower architecture when applying 430 the machine-learning model to examples of the subset of the training data.

Alternatively, the modeling engine 218 uses the two-tower architecture when applying 410 the machine-learned model to examples of the training data and when applying 430 the machine-learned model to examples of the subset of the training data, or the modeling engine 218 uses the Siamese architecture when applying 410 the machine-learned model to examples of the training data and when applying 430 the machine-learned model to examples of the subset of the training data. In other embodiments, the modeling engine 218 configures the machine-learned model in a cross-encoder architecture configured to receive an input that concatenates an item and a query from an example, generate an embedding for the query and an item embedding for the item in a single portion of the machine-learned model and compare the embedding for the query and the item embedding. In some embodiments, the modeling engine 218 uses the cross-encoder architecture when applying 410 the machine-learned model to examples of the training data, while in other embodiments the modeling engine 218 uses the cross-encoder architecture when applying 430 the machine-learned model to examples of the subset of the training data. In the preceding examples, the modeling engine 218 may apply 410 the machine-learned model to examples of the training data using the cross-encoder architecture and apply 430 the machine-learned model to examples of the subset of the training data using the two-tower architecture or the Siamese architecture; alternatively, the modeling engine 218 applies 410 the machine-learned model to examples of the training data using the two-tower architecture or the Siamese architecture and applies 430 the machine-learned model to examples of the subset of the training data using the cross-encoder architecture. Alternatively, the modeling engine 218 uses the cross-encoder architecture when applying 410 the machine-learned model to examples of the training data and when applying 430 the machine-learned model to examples of the subset of the training data. Hence, the modeling engine 218 may use different architectures for the machine-learning model when applying 410 the machine-learned model to examples of the training data and when applying 430 the machine-learning model to examples of the subset of the training data; alternatively, the modeling engine 218 uses a common architecture for the machine-learning model when applying 410 the machine-learned model to examples of the training data and when applying 430 the machine-learning model to examples of the subset of the training data.

While FIG. 4 describes an embodiment where the modeling engine 218 trains the machine-learned model using the training data and a subset of the training data, in other embodiments, the modeling engine 218 generates different subsets of the training data and uses different subsets to train the machine-learned model, as further described above. For example, the modeling engine generates training data from previously received queries, with the training data including a plurality of examples that each include a pair of a query received by the online concierge system 102 and an item, as well as a metric describing user interaction in response to users being shown the item in response to the query. In some embodiments, the metric is a frequency with which users performed one or more interactions during a time interval with the item after the online concierge system 102 received the query. The metric may be based on a specific interaction performed by users or on a combination of interactions performed by users. Additionally, the modeling engine 218 applies a label to each example that indicates whether a user performed an interaction (e.g., a specific interaction, an interaction from a set of interactions) with the item when the item was shown in response to a query.

The modeling engine 218 filters the training data into a noisy subset and a high-quality subset based on the metric included in the examples. In various embodiments, each example of the high-quality subset includes a higher metric than metrics included in examples of the noisy subset. For example, the high-quality subset includes examples of the training data including at least a threshold value, while the noisy subset includes examples of the training data including metrics that exceed a lower threshold value. In some embodiments, the high-quality subset includes multiple replicas of certain examples, as further described above. For example, the high-quality subset includes a particular number of replicas of an example in response to the example having a metric satisfying one or more conditions (e.g., being within a range, exceeding a specific value).

Using the noisy subset and the high-quality subset of the training data, the modeling engine 218 trains the machine-learned model, as further described above in conjunction with FIG. 4. The modeling engine 218 initializes the machine-learned model and applies the machine-learned model to each example of the noisy subset. As further described above in conjunction with FIG. 4, the modeling engine 218 backpropagates one or more error terms obtained from one or more loss functions through layers of a network comprising the machine-learned model to update a set of parameters of the network. An error term from application of the machine-learned model to an example of the noisy subset is based on a difference between a label applied to the example of the noisy subset and a predicted likelihood of the user performing the interaction with the item of the noisy subset based on the query included in the example of the noisy subset from application of the machine-learned model to the example of the noisy subset. The modeling engine 218 stops backpropagation of the error terms in response to the one or more loss functions satisfying one or more conditions and stores the set of parameters for the machine-learned model.

With the parameters of the machine-learned model from training using the noisy subset stored, the modeling engine 218 applies the machine-learned model to each example of the high-quality subset, as further described above in conjunction with FIG. 4. The modeling engine 218 backpropagates one or more error terms obtained from one or more loss functions through layers of a network comprising the machine-learned model to modify the set of parameters of the network. An error term from application of the machine-learned model to an example of the high-quality subset is based on a difference between a label applied to the example of the high-quality subset and a predicted likelihood of the user performing the interaction with the item of the high-quality subset based on the query included in the example of the high-quality subset from application of the machine-learned model to the example of the high-quality subset. The modeling engine 218 stops backpropagation of the error terms in response to the one or more loss functions satisfying one or more conditions and stores the modified set of parameters for the machine-learned model.

Figure 5:
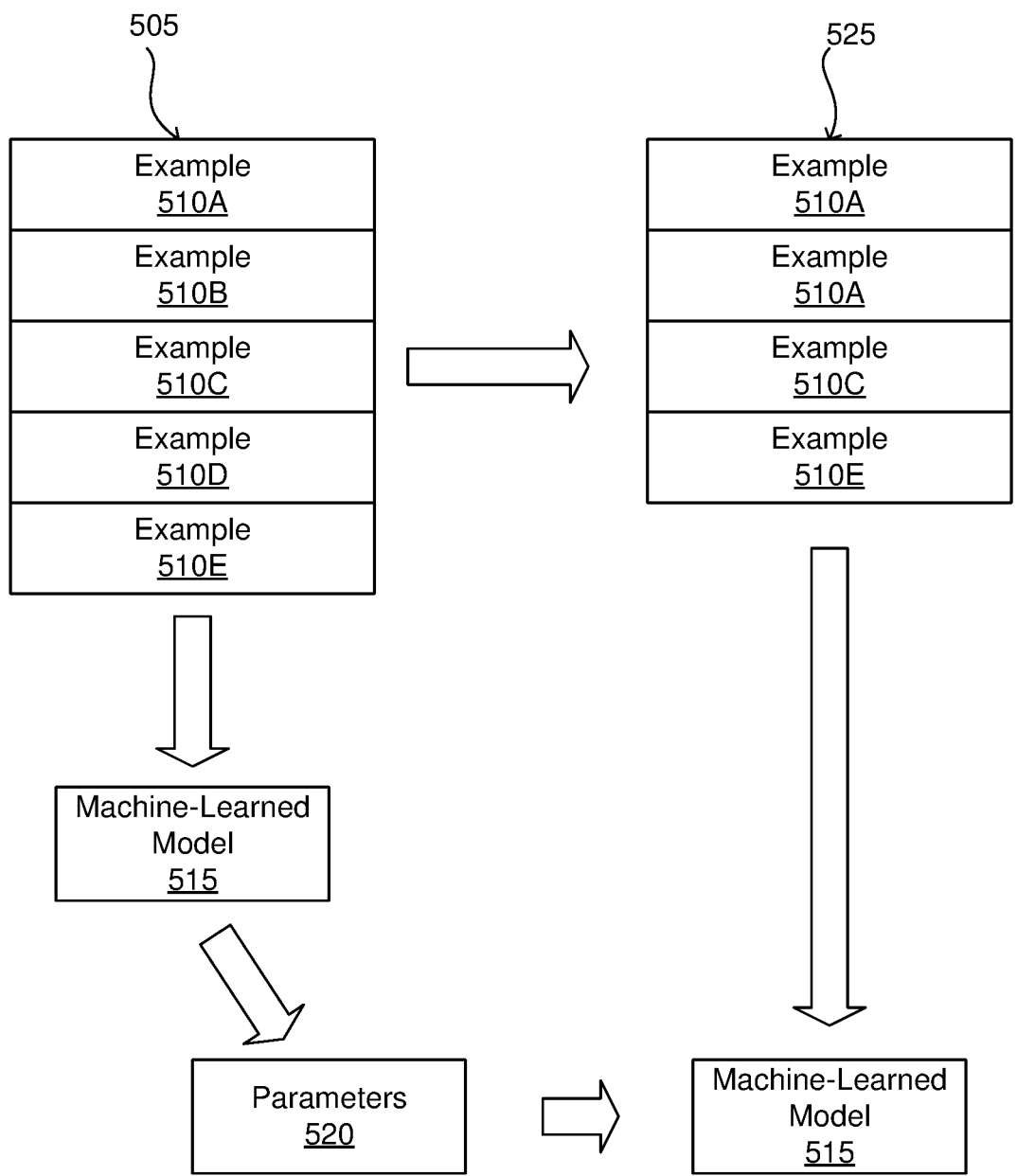
FIG. 5 is a process flow diagram of a method for training a machine-learned model to determine a probability of a user performing an interaction with an item, according to one embodiment.

FIG. 5 is a process flow diagram of one embodiment of a method for an online concierge system 102 training a model to determine a measure of relevance of items to a query. In the example shown by FIG. 5, the online concierge system 102 generates training data 505 including a plurality of examples 510A, 510B, 510C, 510D, 510E from stored interactions by users with items offered by the online concierge system 102. In various embodiments, each example 510A, 510B, 510C, 510D, 510E (also referred to individually and collectively using reference number 510) of the training data 505 includes a query received by the online concierge system 102 and an item with which a user performed a specific interaction after receiving the query, as further described above in conjunction with FIG. 4. In various embodiments, the online concierge system 102 removes duplicate combinations of a query and an item from the training data 505, so different examples 510 do not include matching combinations of query and item. Hence, the online concierge system 102 leverages interactions by users to generate the training data 505 that identifies relationships between queries received from users and items with which the users performed the specific interaction after providing the queries to the online concierge system 102.

Using the training data 505, the online concierge system 102 trains a machine-learned model 515 that receives a query and an item as input and outputs a measure of relevance of the item to the query. As further described above in conjunction with FIG. 4, the online concierge system 102 applies the machine-learned model 515 to each example 510 of the training data 505. To train the machine-learned model 515, the online concierge system 102 backpropagates an error term based on a difference between a label applied to an example 510 of the training data 505 and a predicted measure of relevance output by the machine-learned model 515 through layers of the machine-learned model 515 to update one or more parameters of the machine-learned model 515, as further described above in conjunction with FIG. 4. The online concierge system 102 stores the parameters 520 updated for the machine-learned model 515 from application to examples 510 of the training data 505.

As examples 510 of the training data 505 may include combinations of queries and items where an item with which the specific interaction was performed despite the item being unrelated or less related to the query, which may decrease accuracy of the measures of relevance of items to queries predicted by the machine-learned model 515. To improve accuracy of the machine-learned model 515, the online concierge system 102 generates a subset 525 of the training data by filtering examples 510 of the training data 505 based on one or more condition. Hence, the subset 525 of the training data includes examples 510 of the training data 505 that satisfy the one or more conditions and does not include examples 510 of the training data 505 that do not satisfy the one or more conditions. For example, the online concierge system 102 selects examples 510 from the training data 505 including items with which the specific interaction was performed with at least a threshold frequency for inclusion in the subset 525 of the training data. In the example of FIG. 5, the example 510A, example 510C, and example 510E satisfy the one or more conditions for inclusion in the subset 525 of the training data, while example 510B and example 510D do not satisfy the one or more conditions for inclusion in the subset 525 of the training data. Hence, in the example of FIG. 5, the subset 525 of the training data includes example 510A, example 510C, and example 510E and does not include example 510B and example 510D. In the embodiment shown by FIG. 5, the online concierge system 102 replicates examples 510 in the subset 525 of the training data in response to the examples 510 satisfying one or more additional conditions. In the example of FIG. 5, example 510A satisfies the one or more additional conditions, to the online concierge system 102 includes multiple copies of example 510A in the subset 525 of the training data. While FIG. 5 shows an example where example 510A is replicated twice in the subset 525 of the training data, in other embodiments, example 510A may be replicated any suitable number of times.

The online concierge system 102 initializes the machine-learned model 515 to the parameters 520 stored from application of the machine-learned model 515 to the training data 505 and applies the machine-learned model 515 to the examples 510 included in the subset 525 of the training data. As further described above in conjunction with FIG. 4, the online concierge system 102 modifies one or more parameters of the machine-learning model 515 based on differences between a predicted measure of relevance of an item to a query included in an example 510 of the subset 525 of the training data and a label applied to the example of the subset 525 of the training data. The online concierge system 102 stores the modified parameters for subsequent use by the machine-learned model 515 when applied to a query received from a user and items maintained by the online concierge system 102.

System Architecture

Figure 6:
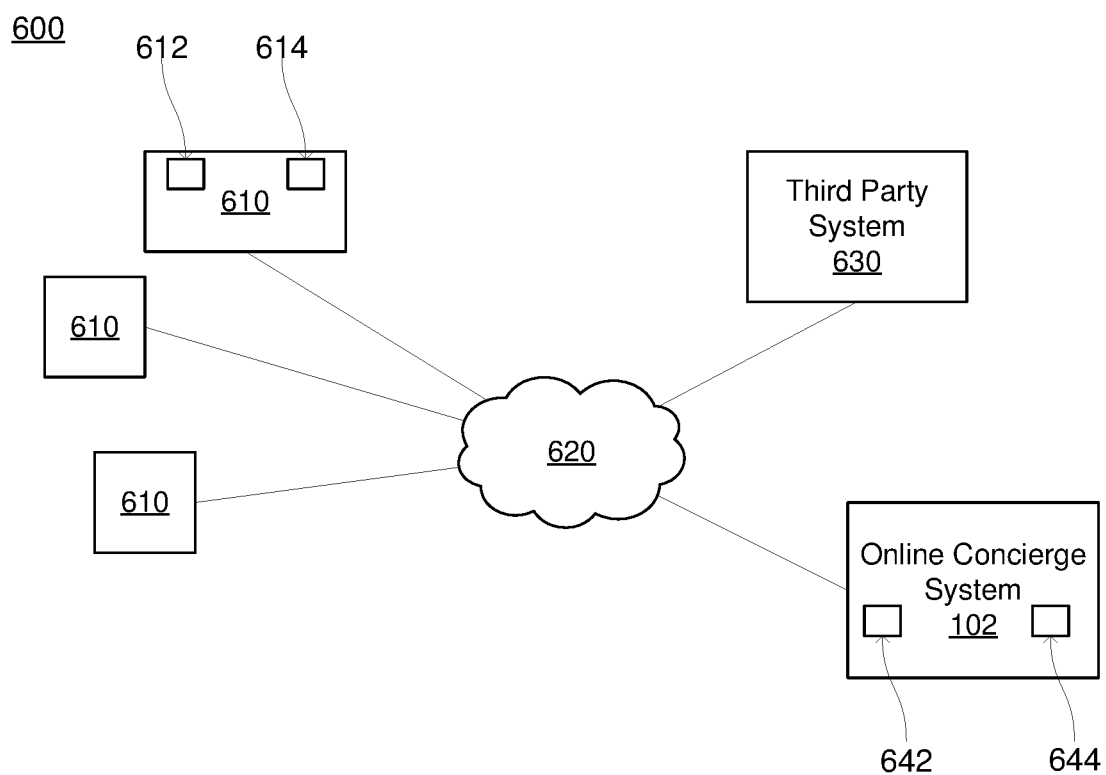
FIG. 6 is a block diagram of a system environment in which an online concierge system operates, according to one embodiment.

FIG. 6 is a block diagram of a system environment 600 for an online concierge system 102. The system environment 600 shown by FIG. 6 comprises one or more client devices 610, a network 620, one or more third-party systems 630, and the online concierge system 102. In alternative configurations, different and/or additional components may be included in the system environment 600.

The client devices 610 are one or more computing devices capable of receiving user input as well as transmitting and/or receiving data via the network 620. In one embodiment, a client device 610 is a conventional computer system, such as a desktop or a laptop computer. Alternatively, a client device 610 may be a device having computer functionality, such as a personal digital assistant (PDA), a mobile telephone, a smartphone, or another suitable device. A client device 610 is configured to communicate via the network 620. In one embodiment, a client device 610 executes an application allowing a user of the client device 610 to interact with the online concierge system 102. For example, the client device 610 executes a customer mobile application 106 or a shopper mobile application 112, as further described above in conjunction with FIGS. 3A and 3B, respectively, to enable interaction between the client device 610 and the online concierge system 102. As another example, a client device 610 executes a browser application to enable interaction between the client device 610 and the online concierge system 102 via the network 620. In another embodiment, a client device 610 interacts with the online concierge system 102 through an application programming interface (API) running on a native operating system of the client device 610, such as IOS® or ANDROID™.

A client device 610 includes one or more processors 612 configured to control operation of the client device 610 by performing functions. In various embodiments, a client device 610 includes a memory 614 comprising a non-transitory storage medium on which instructions are encoded. The memory 614 may have instructions encoded thereon that, when executed by the processor 612, cause the processor to perform functions to execute the customer mobile application 106 or the shopper mobile application 112 to provide the functions further described above in conjunction with FIGS. 3A and 3B, respectively.

The client devices 610 are configured to communicate via the network 620, which may comprise any combination of local area and/or wide area networks, using both wired and/or wireless communication systems. In one embodiment, the network 620 uses standard communications technologies and/or protocols. For example, the network 620 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 620 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 620 may be represented using any suitable format, such as hypertext markup language (HTML) or extensible markup language (XML). In some embodiments, all or some of the communication links of the network 620 may be encrypted using any suitable technique or techniques.

One or more third party systems 630 may be coupled to the network 620 for communicating with the online concierge system 102 or with the one or more client devices 610. In one embodiment, a third party system 630 is an application provider communicating information describing applications for execution by a client device 610 or communicating data to client devices 610 for use by an application executing on the client device. In other embodiments, a third party system 630 provides content or other information for presentation via a client device 610. For example, the third party system 630 stores one or more web pages and transmits the web pages to a client device 610 or to the online concierge system 102. The third party system 630 may also communicate information to the online concierge system 102, such as advertisements, content, or information about an application provided by the third party system 630.

The online concierge system 102 includes one or more processors 642 configured to control operation of the online concierge system 102 by performing functions. In various embodiments, the online concierge system 102 includes a memory 644 comprising a non-transitory storage medium on which instructions are encoded. The memory 644 may have instructions encoded thereon corresponding to the modules further described above in conjunction with FIG. 2 that, when executed by the processor 642, cause the processor to perform the functionality further described above in conjunction with FIG. 2 or FIG. 4. For example, the memory 644 has instructions encoded thereon that, when executed by the processor 642, cause the processor 642 to train a machine-learned model using training data including example pairs of queries and items, with each pair labeled with an indication whether a specific interaction was performed with an item of the pair, and to further refine the model using a subset of the training data including example pairs of queries and items satisfying one or more criteria, as further described above in conjunction with FIGS. 4 and 5. Additionally, the online concierge system 102 includes a communication interface configured to connect the online concierge system 102 to one or more networks, such as network 620, or to otherwise communicate with devices (e.g., client devices 610) connected to the one or more networks.

One or more of a client device, a third party system 630, or the online concierge system 102 may be special purpose computing devices configured to perform specific functions, as further described above in conjunction with FIGS. 2-5, and may include specific computing components such as processors, memories, communication interfaces, and/or the like.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A machine-learned model stored on a non-transitory computer readable storage medium, wherein the machine-learned model is manufactured by a process comprising:

generating training data comprising a plurality of examples, each example comprising a query received by an online concierge system and an item with which a user of the online concierge system performed a specific interaction, wherein a label applied to each example of the training data indicates whether the specific interaction was performed with the item after the online concierge system received the query;

generating a noisy subset of training data and a high-quality subset of training data based on a metric that defines a quality of training data, wherein the high-quality subset has a higher metric value than the noisy subset;

initializing the machine-learned model comprising a network of a plurality of layers, the machine-learned model configured to receive a query and an item and to generate a predicted measure of relevance of the item to the query;

for each of a plurality of the examples of the noisy subset of the training data:

applying, by one or more processors, the machine-learned model to the query of the example of the noisy subset of the training data and to the item of the example of the noisy subset of the training data;

backpropagating, in one or more iterations and by the one or more processors, one or more error terms obtained from one or more loss functions to update a set of parameters of the network, the backpropagating performed through the network and one or more of the error terms based on a difference between the label applied to the example of the noisy subset of the training data and a predicted measure of relevance of the item of the example of the noisy subset of the training data and to the query of the example of the training data;

stopping, by the one or more processors, the backpropagation after the one or more loss functions satisfy one or more criteria;

storing, in the computer readable storage medium, the set of parameters of the network that are updated in the one or more iterations;

initializing the network to the stored set of parameters;

for each of the plurality of the examples of the high-quality subset of the training data:

applying, by the one or more processors, the machine-learned model to the query of the example of the high-quality subset of the training data and to the item of the example of the high-quality subset of the training data;

backpropagating, by the one or more processors, one or more error terms obtained from one or more loss functions to generate a modified set of parameters of the network, the backpropagating performed through the network and one or more of the error terms based on a difference between a label applied to the example of the high-quality subset of the training data and a predicted measure of relevance of the item of the example of the high-quality subset of the training data and to the query of the example of the subset of the training data;

stopping, by the one or more processors, the back-propagation after the one or more loss functions satisfy one or more criteria; and storing, in the computer readable storage medium, the modified set of parameters of the network trained from the subset of the training data as parameters of the machine-learned model.

2. The machine-learned model of claim 1, wherein generating the high-quality subset of training data comprises:

selecting examples of the training data including items with which the specific interaction was performed with at least a threshold frequency.

3. The machine-learned model of claim 2, wherein generating the high-quality subset of training data further comprises:

determining an example of the training data includes an item with which the specific frequency was performed with at least an additional threshold frequency; and including a specific number of replicas of the example determined to include the item with which the specific frequency was performed with at least the additional threshold frequency in the subset of the training data in response to the determining.

4. The machine-learned model of claim 1, wherein generating the high-quality subset of training data comprises:

ranking examples of the training data based on frequencies with which the specific interaction was performed with items included in the examples of the training data;

selecting examples of the training data having at least a threshold position in the ranking.

5. The machine-learned model of claim 4, wherein generating the high-quality subset of training data further comprises:

determining an example of the training data includes an item with which the specific frequency was performed with at least a threshold frequency; and including a specific number of replicas of the example determined to include the item with which the specific frequency was performed with at least the threshold frequency in the subset of the training data in response to the determining.

6. The machine-learned model of claim 1, wherein the specific interaction comprises including the item in an order received by the online concierge system.

7. The machine-learned model of claim 1, wherein backpropagating one or more error terms obtained from one or more loss functions to modify the set of parameters of the network comprises:

generating the one or more error terms from application of the machine-learned model to the example of the high-quality subset of the training data using an alternative loss function than a loss function generating the error term from application of the machine-learned model to the example of the training data.

8. The machine-learned model of claim 7, wherein the alternative loss function applies a higher weight to an error term from application of the machine-learned model to the example of the high-quality subset of the training data than the loss function generating the error term from application of the machine-learned model to the noisy subset of the training data.

9. The machine-learned model of claim 1, wherein applying the machine-learned model to the query of the example of the noisy subset of the training data and to the item of the example of the noisy subset of the training data comprises:

applying the machine-learned model with a particular architecture to the example of the noisy subset of the training data and to the item of the example of the noisy subset of the training data.

10. The machine-learned model of claim 9, wherein applying the machine-learned model to the query of the example of the high-quality subset of the training data and to the item of the example of the high-quality subset of the training data comprises:

applying the machine-learned model with a different architecture than the particular architecture to the example of the high-quality subset of the training data and to the item of the high-quality subset of the example of the training data.

11. A method comprising:

generating training data comprising a plurality of examples, each example comprising a query received by an online concierge system and an item with which a user of the online concierge system performed a specific interaction, wherein a label applied to each example of the training data indicates whether the specific interaction was performed with the item after the online concierge system received the query;

generating a noisy subset of training data and a high-quality subset of training data based on a metric that defines a quality of training data, wherein the high-quality subset has a higher metric value than the noisy subset;

initializing a machine-learned model comprising a network of a plurality of layers, the machine-learned model configured to receive a query and an item and to generate a predicted measure of relevance of the item to the query, for each of a plurality of the examples of the noisy subset of the training data:

applying, by one or more processors, the machine-learned model to the query of the example of the noisy subset of the training data and to the item of the example of the noisy subset of the training data;

backpropagating, in one or more iterations and by the one or more processors, one or more error terms obtained from one or more loss functions to update a set of parameters of the network, the backpropagating performed through the network and one or more of the error terms based on a difference between the label applied to the example of the noisy subset of the training data and a predicted measure of relevance of the item of the example of the training data and to the query of the example of the noisy subset of the training data;

stopping, by the one or more processors, the backpropagation after the one or more loss functions satisfy one or more criteria;

storing, in a computer readable storage medium, the set of parameters of the network that are updated in the one or more iterations;

initializing the network to the stored set of parameters;

for each of the plurality of the examples of the high-quality subset of the training data:

applying, by the one or more processors, the machine-learned model to the query of the example of the high-quality subset of the training data and to the item of the example of the high-quality subset of the training data;

backpropagating, by the one or more processors, one or more error terms obtained from one or more loss functions to generate a modified set of parameters of the network, the backpropagating performed through the network and one or more of the error terms based on a difference between a label applied to the example of the high-quality subset of the training data and a predicted measure of relevance of the item of the example of the high-quality subset of the training data and to the query of the example of the subset of the training data;

stopping, by the one or more processors, the backpropagation after the one or more loss functions satisfy one or more criteria; and storing, in the computer readable storage medium, the modified set of parameters of the network trained from the subset of the training data as parameters of the machine-learned model.

12. The method of claim 11, wherein generating the high-quality subset of training data comprises:

selecting examples of the training data including items with which the specific interaction was performed with at least a threshold frequency.

13. The method of claim 12, wherein generating the high-quality subset of training data further comprises:

determining an example of the training data includes an item with which the specific frequency was performed with at least an additional threshold frequency; and including a specific number of replicas of the example determined to include the item with which the specific frequency was performed with at least the additional threshold frequency in the subset of the training data in response to the determining.

14. The method of claim 11, wherein generating the high-quality subset of training data comprises:

ranking examples of the training data based on frequencies with which the specific interaction was performed with items included in the examples of the training data;

selecting examples of the training data having at least a threshold position in the ranking.

15. The method of claim 14, wherein generating the high-quality subset of training data further comprises:

determining an example of the training data includes an item with which the specific frequency was performed with at least a threshold frequency; and including a specific number of replicas of the example determined to include the item with which the specific frequency was performed with at least the threshold frequency in the subset of the training data in response to the determining.

16. The method of claim 11, wherein the specific interaction comprises including the item in an order received by the online concierge system.

17. The method of claim 11, wherein backpropagating one or more error terms obtained from one or more loss functions to modify the set of parameters of the network comprises:

generating the one or more error terms from application of the machine-learned model to the example of the high-quality subset of the training data using an alternative loss function than a loss function generating the error term from application of the machine-learned model to the example of the training data.

18. The method of claim 17, wherein the alternative loss function applies a higher weight to an error term from application of the machine-learned model to the example of the high-quality subset of the training data than the loss function generating the error term from application of the machine-learned model to the noisy subset of the training data.

19. The method of claim 11, wherein applying the machine-learned model to the query of the example of the noisy subset of the training data and to the item of the example of the noisy subset of the training data comprises:

applying the machine-learned model with a particular architecture to the example of the noisy subset of the training data and to the item of the example of the noisy subset of the training data.

20. A system comprising a computer readable storage medium and one or more processors, wherein the computer readable storage medium is configured to store code comprising instructions, wherein the instructions, when executed by the one or more processors, cause the one or more processors to:

generate training data comprising a plurality of examples, each example comprising a query received by an online concierge system and an item with which a user of the online concierge system performed a specific interaction, wherein a label applied to each example of the training data indicates whether the specific interaction was performed with the item after the online concierge system received the query;

generate a noisy subset of training data and a high-quality subset of training data based on a metric that defines a quality of training data, wherein the high-quality subset has a higher metric value than the noisy subset;

initialize a machine-learned model comprising a network of a plurality of layers, the machine-learned model configured to receive a query and an item and to generate a predicted measure of relevance of the item to the query;

for each of a plurality of the examples of the noisy subset of the training data:

apply, by one or more processors, the machine-learned model to the query of the example of the noisy subset of the training data and to the item of the example of the noisy subset of the training data;

backpropagate, in one or more iterations and by the one or more processors, one or more error terms obtained from one or more loss functions to update a set of parameters of the network, the backpropagating performed through the network and one or more of the error terms based on a difference between the label applied to the example of the noisy subset of the training data and a predicted measure of relevance of the item of the example of the training data and to the query of the example of the noisy subset of the training data;
stop, by the one or more processors, the backpropagation after the one or more loss functions satisfy one or more criteria;
store, in the computer readable storage medium, the set of parameters of the network that are updated in the one or more iterations;
initialize the network to the stored set of parameters;
for each of the plurality of the examples of the high-quality subset of the training data:
apply, by the one or more processors, the machine-learned model to the query of the example of the high-quality subset of the training data and to the item of the example of the high-quality subset of the training data;
backpropagate, by the one or more processors, one or more error terms obtained from one or more loss functions to generate a modified set of parameters of the network, the backpropagating performed through the network and one or more of the error terms based on a difference between a label applied to the example of the high-quality subset of the training data and a predicted measure of relevance of the item of the example of the high-quality subset of the training data and to the query of the example of the subset of the training data;
stop, by the one or more processors, the backpropagation after the one or more loss functions satisfy one or more criteria; and
store, in the computer readable storage medium, the modified set of parameters of the network trained from the subset of the training data as parameters of the machine-learned model.

* * * * *